United States Patent [19]

Tano et al.

[11] 4,324,468
[45] Apr. 13, 1982

[54] ELECTRIC SOURCE CIRCUIT FOR CAMERA

[75] Inventors: Eiichi Tano, Fukuoka; Kojo Suzuki, Asaka, both of Japan

[73] Assignee: Asahi Kogaku Kogyo Kabushiki Kaisha, Tokyo, Japan

[21] Appl. No.: 197,356

[22] Filed: Oct. 15, 1980

[30] Foreign Application Priority Data

Nov. 2, 1979 [JP] Japan ................ 54/152714[U]

[51] Int. Cl.³ ............................................... G03B 15/05
[52] U.S. Cl. ..................................... 354/149; 354/266
[58] Field of Search ............... 354/60 R, 60 F, 139, 354/145, 149, 266

[56] References Cited

U.S. PATENT DOCUMENTS

| | | | |
|---|---|---|---|
| 4,086,582 | 4/1978 | Kiyohara et al. | 354/139 X |
| 4,174,165 | 11/1979 | Hohda et al. | 354/145 X |
| 4,236,796 | 12/1980 | Hayashi et al. | 354/145 |

*Primary Examiner*—Michael L. Gellner
*Attorney, Agent, or Firm*—Sughrue, Mion, Zinn, Macpeak and Seas

[57] ABSTRACT

An electric source circuit for a camera in which the voltage of a power source is automatically applied to the exposure control and display circuit of a camera when the electronic flash is fully charged. A first switch circuit is operatively coupled between a power source and the exposure control and display circuit. A photometric switch for controlling the conduction and nonconduction of the first switching circuit is coupled in parallel with the second switching circuit. The second switching circuit is coupled to detect when the electronic flash mounted on the camera is fully charged. A third switching circuit can be provided for activating an indicating device such as an LED or piezoelectric transducer.

4 Claims, 2 Drawing Figures

ELECTRIC SOURCE CIRCUIT FOR CAMERA

BACKGROUND OF THE INVENTION

The present invention relates to an electric source circuit for a camera.

A conventional photographing operation with an electronic flash mounted on a camera is inconvenient in that the photographer must carry out the photographing operation by viewing the object through the viewfinder of the camera while simultaneously checking the state of the flash charge completion display lamp which is positioned outside of the viewfinder. Recently, a method has been proposed and put into commercial practice in which the completion of the charging of an electronic flash is displayed by operating a light emitting element such as a light emitting diode (LED) which is provided in the viewfinder of a camera. However, this method is still disadvantageous and inconvenient in that the photographer can operate the exposure control and display circuit of the camera only by turning on a photometric switch in advance.

SUMMARY OF THE INVENTION

Accordingly, an object of the invention is to eliminate the above-described difficulties. A specific feature of the invention resides in a simple electric source circuit for a camera with which the voltage of the power source is automatically applied to the exposure control and display circuit of the camera when the electronic flash is fully charged.

More specifically, in accordance with this and other objects of the invention, there is provided an electric source circuit for a camera including a first switching circuit operatively coupled between a power source and an exposure control and display circuit in a camera, a photometric switch for controlling the conduction and non-conduction of the first switching circuit, and a second switching circuit connected in parallel with the photometric switch for detecting when an electronic flash mounted on a camera is fully charged. In an alternative embodiment, a third switching circuit is provided coupled operatively between the output terminal of the first switching circuit and the terminal of the power source coupled to the exposure control and display circuit.

Yet more specifically, the objects of the invention are met by an electric source circuit for a camera including a power source and a first transistor of a first conductivity type with an emitter coupled to a first terminal of the power source. The collector terminal of the first transistor is coupled to a first input terminal of the exposure control and display circuit while a second input terminal of the exposure control and display circuit is coupled to a second terminal of the power source. A first resistor is coupled between the base and emitter of the first transistor while a resistor is coupled in series with a photometric switch which has one terminal coupled to the second terminal of the power source and the base of the first transistor. A second transistor has a collector coupled to the junction between the second resistor and photometric switch and an emitter terminal coupled to ground. A third resistor is coupled between the base of the second transistor and an active terminal of the electronic flash unit. A fourth resistor is coupled between the base of the second transistor and the second terminal of the power source. If desired, a third transistor can be provided having a base coupled to the base of the second transistor, an emitter coupled to the second terminal of the power source and a collector coupled to a control input of the exposure control and display circuit for activating an indicating device such as a LED device positioned in the viewfinder of the camera or an audio signal producing device such as a piezoelectric transducer. In this case, a fifth resistor is provided coupled between the collector of the first transistor and the collector of the third transistor.

DESCRIPTION OF THE PREFERRED EMBODIMENTS

Preferred embodiments of the invention will be described with reference to the accompanying drawings.

Figure 1:
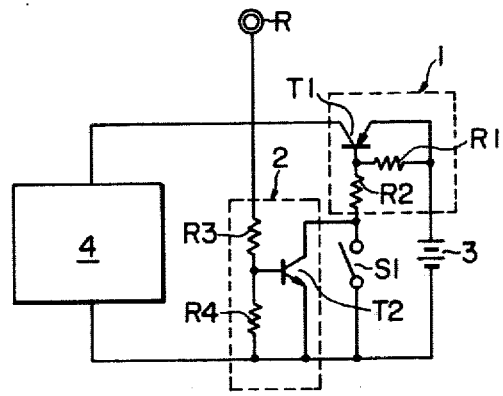
FIG. 1 is a circuit diagram of a first embodiment of an electric source circuit constructed according to the invention.

In the accompanying drawings, FIG. 1 shows a first embodiment of an electric source circuit of the invention. As shown in FIG. 1, a first switching circuit 1 is made up of a PNP transistor $T_1$ and resistors $R_1$ and $R_2$. The emitter of the transistor $T_1$ and a first terminal of the resistor $R_1$ are connected to the positive terminal of a power source 3. The collector of the transistor $T_1$ is connected to an exposure control and display circuit 4. The base of the transistor $T_1$ is connected through the resistor $R_2$ to a first contact of a photometric switch $S_1$ the other contact of which is connected to the negative terminal of the power source 3. A second switching circuit 2 is made up of an NPN transistor $T_2$ and resistors $R_3$ and $R_4$ of which first terminals are connected to the base of the transistor $T_2$. The emitter of the transistor $T_2$ and the second terminal of the resistor $R_4$ are connected to the negative terminal of the power source 3. The collector of the transistor $T_2$ is connected to the first contact of the photometric switch $S_1$. The base of the transistor $T_2$ is connected through the resistor $R_3$ to a terminal R which is connected to the active terminal of an electronic flash. As may be seen from the diagram of FIG. 1, the photometric switch $S_1$ is connected in parallel with the second switching circuit 2.

The operation of the first embodiment of an electric source circuit constructed according to the invention will now be described. When the photometric switch $S_1$ is turned on, the transistor $T_1$ is rendered conductive so that the first switching circuit 1 is rendered conductive thereby permitting the operation of the exposure control and display circuit 4. Under this condition, the electronic flash is connected to the camera.

In this discussion, it is assumed that, when the electronic flash has been fully charged, a voltage high enough to render the transistor $T_2$ conductive is applied to the terminal R from the electronic flash. Therefore, when the electronic flash has been charged, the transistor $T_2$ is rendered conductive and the base current of the transistor $T_1$ flows as the collector current of the transistor $T_2$; i.e. transistor $T_1$ and switching circuit 1 are rendered conducting. Accordingly, similar to the case of turning on the photometric switch $S_1$, the voltage of the power source 3 is applied to the exposure control and display circuit 4 to operate the latter. More specifically, in this case, the voltage of the power source 3 minus the saturation voltage of the transistor $T_1$ is applied to the exposure control and display circuit 4. However, the circuit 4 is satisfactorily operated because the saturation voltage of the transistor $T_1$ is lower than about 100 mV.

Figure 2:
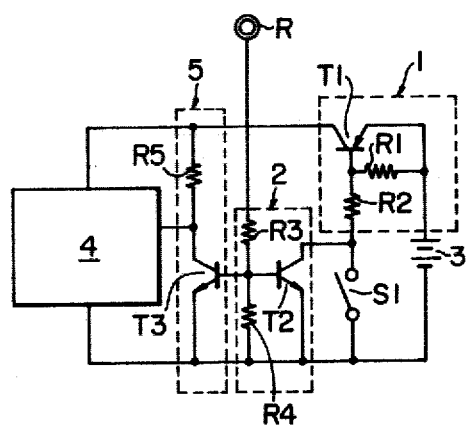
FIG. 2 is a circuit diagram showing a second embodiment of an electric source circuit of the invention.

A second embodiment of an electric source circuit constructed according to the invention is provided by adding a third switching circuit 5 to the circuit of FIG. 1 as shown in FIG. 2. In FIG. 2, the arrangement of the components 1 through 4, $T_1$, $T_2$, $R_1$ through $R_4$, and $S_1$ is the same as that in FIG. 1.

The third switching circuit 5 is constituted by a resistor $R_5$ and an NPN transistor $T_3$. The emitter of the transistor $T_3$ is connected to the negative terminal of the power source 3 and the base of the transistor $T_3$ is connected to the base of the transistor $T_2$. The collector of the transistor $T_3$ is connected through the resistor $R_5$ to the collector of the transistor $T_1$. The output of the switching circuit 5 is applied to a control input of the exposure control and display circuit 4.

When a voltage is applied to the terminal R by the electronic flash, the voltage of the power source 3 is supplied to the exposure control and display circuit 4 as described above. The output state of the third switching circuit 5 is inverted with respect to that of the transistor $T_1$. The inverted output of the third switching circuit 5 is applied to the control input of the exposure control and display circuit 4. In this case, the exposure control and display circuit 4 is so constructed that, when the output of the third switching circuit 5 is applied to the control input of the circuit 4, a flash synchronization exposure time is set, or a display element (not shown) positioned in the viewfinder or a sound generating element (not shown) such as a piezoelectric buzzer, is activated to indicate that the flash-charging operation has been completed. With the photometric switch $S_1$ maintained in the off position, the voltage of the power source is still applied to the exposure control and display circuit immediately upon the electronic flash being fully charged. Thus, the photographer can detect the completion of the charging of the electronic flash through his sense of sight or hearing. Thus, the photographer can fully devote himself to the photographing operation paying attention only to the display in the viewfinder or the sound from the sound generating element.

As is clear from the above description, with an electronic source circuit according to the invention, the voltage of the power source is applied to the exposure control and display circuit of the camera immediately upon the electronic flash mounted on the camera being fully charged. Accordingly, the photographer can fully devote himself to the photographing operation with the photometric switch of the camera maintained in the off position and without having to move his eyes away from the viewfinder to observe the state of the lamp which indicates the completion of the charging of the electronic flash.

What is claimed is:

1. In an electronic source circuit for a camera having in the viewfinder thereof a display element which is activated upon the completion of charging of an electronic flash unit on the camera when a photometric switch is manually closed to connect a power source to the exposure control and display circuit of the camera, the improvement comprising:

first switching circuit means coupled between the power source and the exposure control and display circuit, said switching circuit means being rendered conductive upon closing of the photometric switch to connect the power source to the exposure control and display circuit; and second switching circuit means, connected in parallel with the photometric switch and rendered conducting in response to the charge voltage upon completion of the charging of the electronic flash unit, for connecting the power source to the exposure control and display circuit even when the photometric switch is open.

2. The improvement of claim 1 further comprising third switching circuit means coupled to a control input of the exposure control and display circuit and responsive to the charge voltage upon completion of the charging of the electronic flash unit to apply a control signal to said control input when the power source is connected to the exposure control and display circuit.

3. An electric source circuit for a camera comprising:
    an electric source;
    a first transistor having an emitter coupled to a first terminal of said power source;
    a first resistor coupled between said emitter and a base of said first transistor;
    a photometric switch, a first terminal of said photometric switch being coupled to a second terminal of said power source;
    a second resistor having a first terminal coupled to said base of said first transistor and a second terminal coupled to a second terminal of said photometric switch;
    a second transistor of a conductivity type opposite that of said first transistor, said second transistor having a collector coupled to said second terminal of said photometric switch and an emitter coupled to said second terminal of said power source; and
    a third resistor having a first terminal coupled to said base of said second transistor and a second terminal adapted to be coupled to an active terminal of an electronic flash unit, a collector of said first transistor and said second terminal of said power source being coupled to an exposure control and display circuit in said camera.

4. The electric source circuit of claim 3 further comprising a third transistor of the same conductivity type as said second transistor, said third transistor having an emitter coupled to said second terminal of said power source, a base coupled to said base of said second transistor, and a collector coupled to a control input of said exposure control and display circuit for operating an indicating device therein and a fifth resistor having a first terminal coupled to said collector of said third transistor and a second terminal coupled to said collector of said first transistor.

* * * * *